May 5, 1959 F. H. BELSEY ET AL 2,885,624
DYNAMO-ELECTRIC CONTROL SYSTEM EMPLOYING SATURABLE
CORE REACTANCE DEVICES
Filed March 28, 1955 5 Sheets-Sheet 1
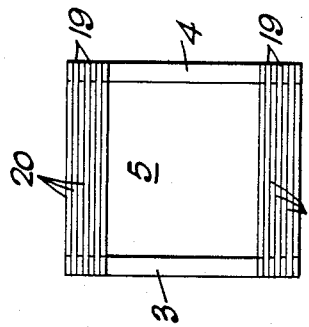
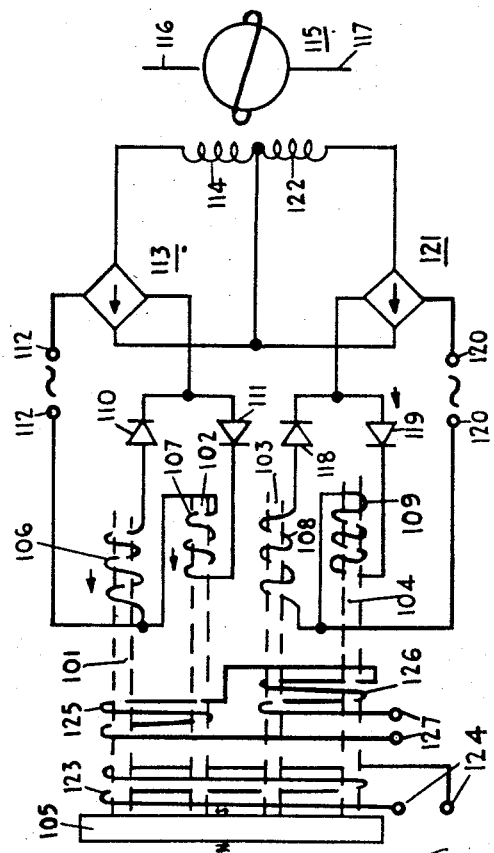
INVENTORS
Frederick Harold Belsey
Colin David McKenzie Johnston
By Morris L. Bateman
ATTORNEYS

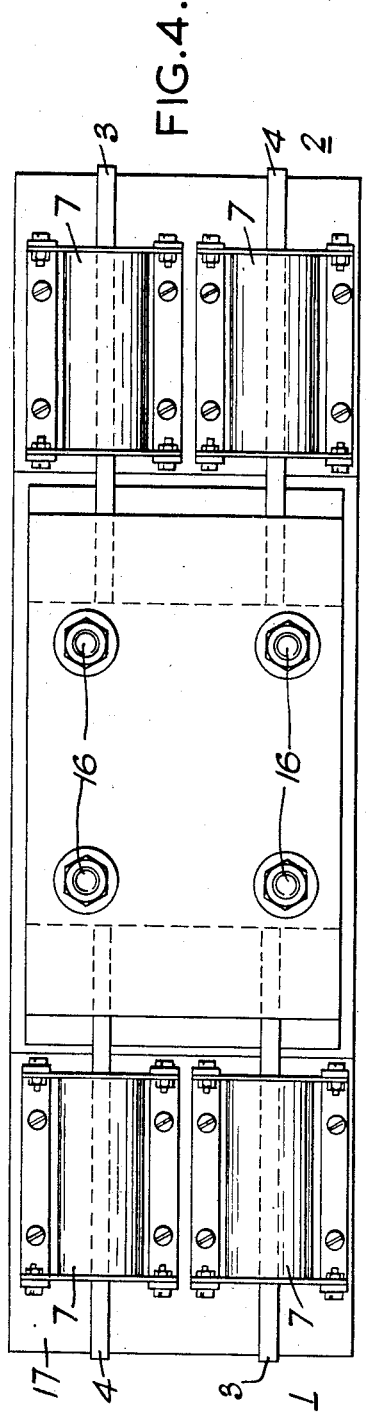
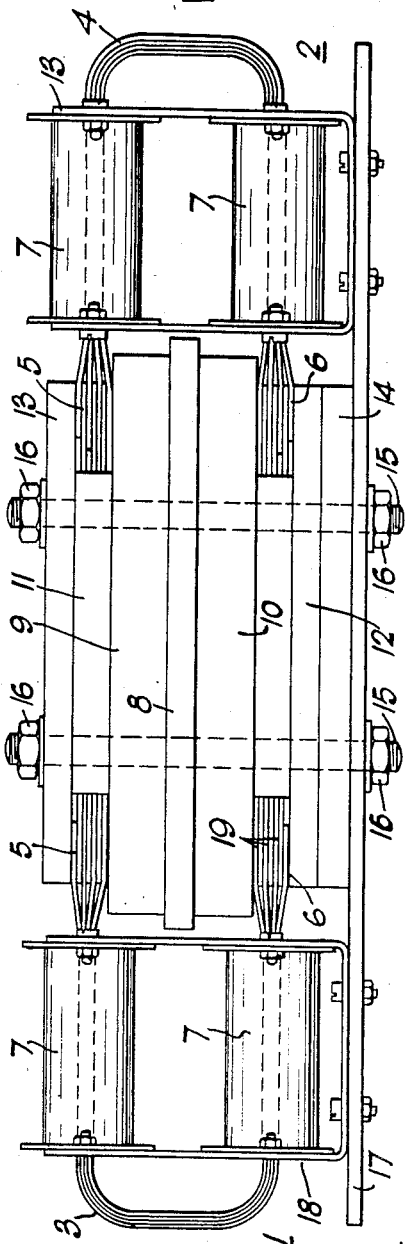
FIG.4.
FIG.5.

United States Patent Office 2,885,624
Patented May 5, 1959

2,885,624

DYNAMO-ELECTRIC CONTROL SYSTEM EMPLOYING SATURABLE CORE REACTANCE DEVICES

Frederick Harold Belsey, Gwytherin, Abergele, Wales, and Colin David McKenzie Johnston, St. Lawrence, Ventnor, Isle-of-Wight, assignors to Metropolitan-Vickers Electrical Company Limited, London, England, a British company Application March 28, 1955, Serial No. 497,334

Claims priority, application Great Britain April 2, 1954

14 Claims. (Cl. 322—28)

This invention relates to saturable core reactance devices or transductors, that is to say, devices comprising a magnetic core having linked therewith a winding connected or adapted to be connected in an alternating current circuit, the effective impedance of said winding being determined by magnetic saturation effects in the core under control of direct current ampere turns providing unidirectional, but sometimes reversible, magnetization of the core.

The invention has for its object to provide an advantageous arrangement employing transductors for producing an output which is dependent as to magnitude and sense on the magnitude and sense of a controlling or input current or currents, in relation to a standard or reference quantity. Arrangements of this kind are for example applicable in alternator voltage regulator systems wherein an exciter or a series of exciters in cascade, is energized in accordance with said output so as to adjust the alternator excitation in accordance with the difference between an input current to the transductor arrangement and a reference value, the main input current of the transductor being proportional to the alternator voltage. A further input current may be supplied to the transductor for stabilization of the regulating operation.

Another application of the invention is for instance in the speed control of motors, the input current to the transductor arrangement being proportional to motor speed using for example a tacho-generator. It is to be understood that the invention has application in many other types of regulator or control systems.

According to the present invention, a transductor arrangement comprises at least one saturable core having linked therewith two output windings connected in an alternating current output circuit with a control winding or windings connected or adapted to be connected in an input circuit or circuits to provide direct current ampere turns magnetizing said core, for producing self-excitation of the core or cores, and a permanent magnet member in combination with said core whereby the latter receive from said permanent magnet member a magneto-force tending to cause flux to pass through said core in opposition to the magneto-motive force produced on said core by said control winding or windings. The self-excitation may be provided by any suitable means, for example, as is well known, the two output windings on each core may be connected in series or in parallel with one another and the limits may carry feedback windings, or a single winding linking two limbs of the core, and supplied from the output windings by means of a full wave rectifier, or said output windings may be connected in parallel with one another in the output circuit with half wave rectifiers included in series respectively with the two output windings so that the latter carry pulsating uni-directional currents in alternate half waves of the applied alternating voltage.

In any of these arrangements for providing self-excitation, additional sensitivity may be obtained by passing the unidirectional load current through an additional feedback winding or windings linking the cores. A full-wave rectifier may be used to provide a unidirectional current through the load.

According to a further feature of the invention, the transductor arrangement comprises two saturable cores, each as hereinbefore set forth, with the input and output windings on the two cores connected for push-pull operation. The load may then comprise two oppositely acting parts, which parts are connected in circuits with the output windings and half wave rectifiers of the two cores, respectively, in separate circuits extending respectively from the two ends of a centre-tapped supply to the centre-tapping of said supply. In a preferred arrangement, however, the two output windings on each core are connected respectively with the opposite ends of a centre-tapped supply means and the two output windings on the other core are connected with the other end of said centre-tapped supply means, in combination with a load comprising two parts, one of which parts is connected between the centre-tapping of said supply means and the output windings on one core, and the other of which parts is connected between said centre-tapping and the output windings on the other core, whereby to energize each part of the load with a unidirectional current derived in alternate half waves from opposite ends of said supply.

The output circuit may be of any form suitable in each particular application of the arrangement, for example, the load may comprise a field winding of a dynamo electric machine, which field winding comprises two sections connected such that the unidirectional output currents of two push-pull transductors respectively pass through each, and such that the two sections act in opposition to one another; the transductors may then be biased to the mid-point or to zero of their output characteristics. Suitable biasing windings connected with a source of biasing current may be provided on the two cores.

If a greater power output is required from the device, the load circuit may consist of the control windings of one conventional transductor or a pair of such transductors connected in push-pull.

The invention is thus applicable, inter alia, to systems wherein the output windings are connected directly or by an intervening amplifying stage with a load comprising a controlling winding of a dynamo electric machine and in which the input winding or windings is/are connected in an input circuit responsive to an operating characteristic of said machine whereby to regulate said characteristic to a predetermined value.

Reference will now be made by way of example to the accompanying drawings, in which:

Fig. 1 is an electrical circuit diagram showing one embodiment of the invention;

Figs. 4 and 5 are respectively a plan and side elevation of one construction of transductor adapted for connection in accordance with the present invention;

Fig. 7 is an end elevation of the core of Fig. 6;

Figure 2:
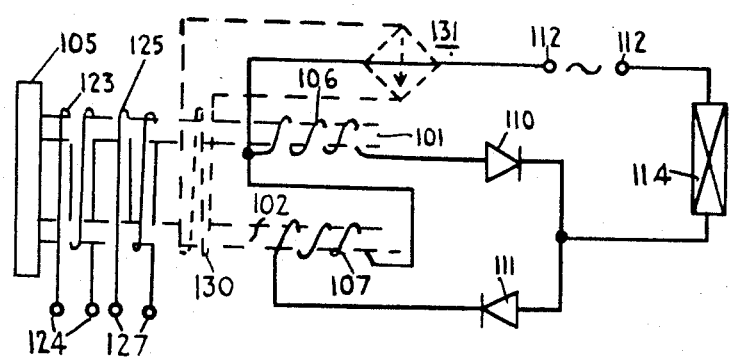
Figs. 2 and 3 are electrical circuit diagrams illustrating, respectively, two modifications of the arrangement of Fig. 1.

In the arrangement shown in Fig. 1, two saturable cores are employed, one core having limbs 101 and 102 and the other core having limbs 103 and 104. These limbs are shown in a diagrammatic manner only in Fig. 1, but it will be understood that each pair of limbs 101, 102, and 103, 104 constitute parts of a closed magnetic circuit carrying alternating flux. These cores are arranged in conjunction with a permanent magnet member 105 which causes a uni-directional flux to pass along each of the four limbs, in the same direction in all the limbs.

The saturable cores may advantageously be constructed in conjunction with the permanent magnet member 105 in a manner hereinafter to be described with reference to Figs. 4–7 inclusive, it being understood that the construction according to said Figs. 4–7 forms, per se, no part of the present invention.

The cores 101–104 carry respective output windings 106–109. The windings 106 and 107 are connected in parallel circuits with one another, said circuits including single wave dry-plate or other rectifiers 110 and 111 arranged to conduct current in said windings so that the latter will produce ampere turns acting in opposition for the two windings in the closed alternating flux circuit provided by the core constituted by the limbs 101 and 102. These parallel circuits are included in series with a source of alternating current at 112 and a load which, in the example illustrated, comprises a full wave dry-plate or other load rectifier 113 and one part 114 of a controlling field winding of a dynamoelectric machine, shown by way of example as a metadyne 115, the output brushes of which are connected by means of conductors 116 and 117 with any desired apparatus or machine to be controlled by the transductor. Examples of such controlled machine will hereinafter be described with reference to Figs. 9 and 10.

In a similar manner, the output windings 108 and 109 are connected in parallel circuits with one another, which circuits include half-wave dry-plate or other rectifiers 118 and 119, these output windings and rectifiers being connected in series with a source of alternating current at 120, and another part of the load comprising, in the example illustrated, a further full-wave dry-plate or other load rectifier 121 and a further part 122 of the controlling field winding of the metadyne, said part acting in opposition to the part 114.

The half-wave rectifiers 110, 111, 118, and 119 provide auto-self-excitation in the manner well known in the art.

The four saturable limbs 101–104 carry an input or control winding 123 connected with input terminals 124, said terminals being connected in series with any desired circuit arrangement for producing the required control of the metadyne 115 or other load. This winding produces on the four limbs unidirectional magnetomotive forces which act in opposition to the magneto force of the permanent magnet member 105, which member as above described, tends to cause unidirectional flux to flow through the four limbs in parallel with one another.

The four cores may, in accordance with the usual practice, be provided with biasing windings shown at 125 for the cores 101 and 102, and at 126 for the cores 103 and 104, these windings being connected at 127 with a suitable source of constant voltage direct current.

On the limbs 101 and 102 of one saturable core, the magnetomotive forces of the output windings 106 and 107 act in the same direction as that of the permanent magnet member 105, whereas on the limbs 103 and 104 of the other saturable core the output windings 108 and 109 act in opposition to the magnetomotive force of the member 105. The ampere turns provided by the biasing windings 125 and 126 bias the transductor arrangement to provide the required push-pull operation. When the input current flowing in the winding 123 has a predetermined value corresponding with a predetermined value of a variable quantity applied to the input terminals 124, the magnetomotive force due to said winding will balance the magnetomotive force due to the permanent magnet member 105, and the resultant output from the two load rectifiers 113 and 121 will be zero, that is to say, the currents in the two parts 114 and 122 of the controlling winding will be equal to one another. When the input current differs from said value, then the resultant magnetomotive forces due to the winding 123 and the member 125 acting in opposition to one another will cause a unidirectional flux to flow in one direction or the other in each of the saturable limbs 101–104, said direction depending on the sense of said difference, whereby to produce a resultant output of the load rectifiers in one direction or the other correspondingly.

Fig. 2 illustrates an arrangement applicable where push-pull operation is not required, the arrangement comprising therefore a single saturable core consisting of limbs 101 and 102, and the load 114 comprising a single part energised from the output windings 106 and 107. The arrangement then operates so that when the magnetomotive force produced by the winding 123 is equal to that produced by the permanent magnet member 105 the output current flowing in the load 114 will have any desired value, adjustable by the fixed current supplied to the biasing winding 125, but may be zero. The arrangement will then operate so as to provide an increased load current when the magnetomotive force of the winding 123 is below that of the winding 105, and, in the case where the biasing winding 125 produces a finite value of output current when the magnetomotive forces of the control winding 123 and member 105 are equal to one another, increase of current in winding 123 will provide reduction of output current in the load 114.

As described with reference to Fig. 1, the rectifiers 110 and 111 provide for auto-self-excitation. If desired, additional sensitivity of the output current to the control or input current may be obtained, as shown in broken lines in Fig. 2, by means of a feedback winding 130 which is connected in series in the output circuit by means of a full-wave dry-plate or other rectifier 131, the winding 130 acting in the direction to increase the output current.

In the arrangement illustrated by Fig. 3, the self-excitation is obtained entirely by means of a winding 130 supplied, as described with reference to Fig. 2, from a rectifier 131 in the output circuit of the transductor, the output windings 106 and 107 in this case being connected in series with one another and the rectifiers 110 and 111 omitted.

Figure 3:
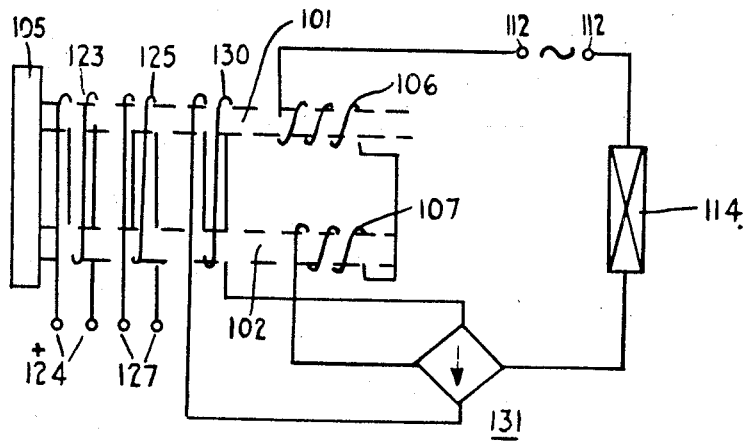
Figure 6:
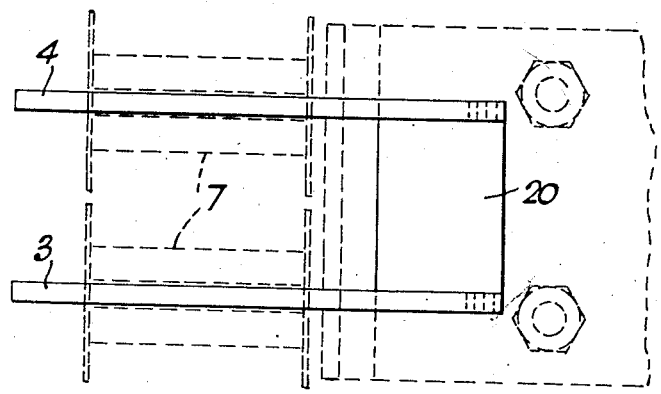
Fig. 6 is a plan view showing the construction of the saturable cores in the arrangement of Figs. 4 and 5.

Alternatively, the windings 106 and 107 of Fig. 3 may be connected in parallel with one another.

It will be understood that the arrangement illustrated in Fig. 2 for obtaining additional sensitivity and the arrangement illustrated in Fig. 3 for obtaining the self-excitation may be employed also in the arrangement hereinbefore described with reference to Fig. 1, and may also be applied in the arrangements which will hereinafter be described with reference to Figs. 8, 9, and 10.

It will be understood that in Figs. 2 and 3, the load 114 may include a full-wave dry-plate rectifier where unidirectional energization of the load is required, and similarly in Fig. 1 the load rectifiers 113 and 121 may be omitted where the load parts 114 and 122 are of an alternating current nature.

An advantageous construction of the transductor employed for carrying out the present invention will now be described with reference to Figs. 4–7, this construction, however, as hereinbefore stated, forming, per se, no part of the present invention.

In the arrangement of Figs. 4 and 5, a pair of U-shaped cores are employed at 1 and 2. The core 1 corresponding with the limbs 101 and 102 of Figs. 1, 2, and 3, and the core 2 corresponding with the limbs 103 and 104 of Fig. 1. The construction according to Figs. 4 and 5 may thus be employed with only one of such cores. Each of the cores is laminated and comprises a pair of limbs 3 and 4 (corresponding with the limbs 101, 102 and 103, 104) with yokes at 5 and 6 arranged as will hereinafter be described with reference to Figs. 6 and 7. The limbs 3 and 4 and yokes 5 and 6 correspond with a rectangular shaped core in which, however, the limbs are formed into a U-shape. The limbs of these U-shaped cores carry the output and control windings and any other windings required, such windings being preferably subdivided into two sections wound respectively on the two straight parts of each limb, namely at 7, so that there will be four coil bobbins on each core.

The core construction comprises, in addition to the one or more laminated cores such as 1 and 2, a permanent magnet 8 (Fig. 5) corresponding with member 105 of Figs. 1, 2, and 3, of slab form having a dimension in the magnetized direction thereof short in relation to the cross-sectional area of the magnet. For example the slab may have a thickness, that is to say a dimension, in the direction of magnetization of approximately ¼ inch and a length and width of approximately 5 inches and 3 inches respectively. Two slabs 9 and 10 of mild steel or similar material are respectively arranged in contact with the north and south polar faces of the permanent magnet member 8 and provide magnetic connections between the respective ends of the core limbs 3 and 4 and the north and south polar faces of the magnet member. On the outer faces of the slabs 9 and 10 two further slabs 11 and 12 of mild steel or similar material are symmetrically arranged, the slabs 11 and 12 having a thickness equal to the thickness of the laminated cores 1, 2 at the yokes 5 and 6 thereof. The slabs 11 and 12 are, however, shorter than the slabs 9 and 10 by a distance somewhat greater than twice the width of said yokes. The yokes 5 and 6 of each saturable core are held in place by clamping plates 13 and 14 and clamping studs 15 with nuts 16, said studs extending through aligned perforations in the several plates and the permanent magnet member, and serving also to locate said plate and member in assembled position. Conveniently the assembly of permanent magnet member and plates and the saturable core or cores is mounted on an insulating or other base plate 17, through which the studs 16 also extend. Said base plate may carry U-shaped brackets 18 provided with openings through which the limbs 3 and 4 extend, and serving to support the coil bobbins 7.

The yokes 5 and 6 are preferably formed of laminations having a greater width than that of the limbs 3 and 4, for example three or four times the width of the latter. According to a preferred construction, as can more readily be seen from the detail views of Figs. 6 and 7, the yokes 5 and 6 each comprise alternate laminations of different ranges, namely longer laminations 19 (see also Fig. 2) which are received between the ends of the laminations of the two limbs of the core. This construction ensures that the limbs 3 and 4 will saturate magnetically at flux values less than those at which the laminations bridging the butt joint in the core would saturate. If the yokes were made of the same width as the limbs, then partial saturation might occur at the overlapping butt joints at a flux density equal to half the maximum value, and the magneto-motive force balance characteristic of the device would be adversely affected.

Preferably the laminations of the limbs are progressively shorter as the distance of the lamination from the inner face of the yoke, namely adjacent the member 9 or 10 as the case may be, increases, as can be seen from Fig. 5. It will be understood that in Figs. 5, 6, and 7 the thickness of the laminations is exaggerated in the interests of clarity, but in practice the limbs and yokes will comprise laminations which are of smaller thickness and of greater number than illustrated, for example the laminations may have a thickness of the order of 0.002″ (two thousandths of an inch).

In order to maintain the uni-directional magneto-motive force constant within specified limits, it is necessary to make the area $A_M$ of the permanent magnet member satisfy the following condition $$A_M = \frac{\Delta \varphi_{DC}}{\Delta_H} \cdot \frac{1}{\mu_\Delta}$$

where $\Delta \varphi_{DC}$ = total change of D.C. flux in the magnet due to extreme changes of net signal.
$\Delta_H$ = permitted change of magnet H.
$\mu_\Delta$ = incremental permeability of permanent magnet material.

It should be noted that in the expression $$A_M = \frac{\Delta \varphi_{DC}}{\Delta_H} \cdot \frac{1}{\mu_\Delta}$$

which determines the area $A_M$ of the permanent magnet member $\Delta \varphi_{DC}$ = total change in D.C. flux in the permanent magnet member over the total control range.

It will be appreciated that with the constructions according to Figs. 4–7, the ends of the core limbs are located adjacent the polar faces of the permanent magnet member 8 so that the length of flux path between each polar face of the permanent magnet member 8 and the laminated saturable core or cores 1, 2 through slabs 9 and 10 is short so as to absorb only a small part of the magneto-motive force of the permanent magnet member.

Figure 8:
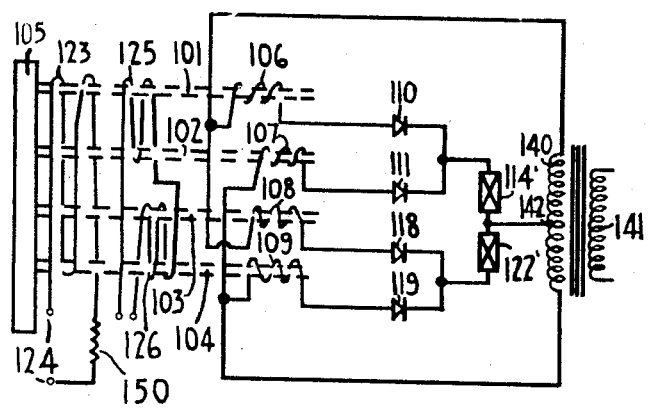
Fig. 8 is an electrical circuit diagram illustrating a still further modification of the arrangement of Fig. 1.

Fig. 8 shows a modification of the arrangement of Fig. 1, wherein the two parts of a transductor comprising the four limbs 101–104 are connected for push-pull operation and auto-self-excitation by connection of the windings 106 and 108 with one end of a centre-tapped secondary winding 140 of a supply transformer having a primary winding 141, whilst the output windings 107 and 109 are connected with the other end of said secondary winding. The load comprises two parts 114′ and 122′ of which the part 114′ is connected between the centre-tapping 142 of the winding 140 and by means of the rectifiers 110 and 111 with the windings 106 and 107, whereas the load part 122′ is connected between said centre-tapping and, by means of the rectifiers 118 and 119, with the output windings 108 and 109. Thus the part 114′ of the load is energized in alternate half-waves of the supply voltage from the windings 106 and 107 on the limbs 101 and 102 of the two cores, whilst the load part 122′ is energized in alternate such half-waves from the windings 108 and 109 on the limbs 103 and 104.

In the case of some of the permanent magnet materials as may be employed for the member 105, the magneto-motive force falls slightly with increase in temperature. Preferably, therefore, in order that the output of the device shall not vary with temperature, a resistor 150 is included in series with the control or input winding 123, said resistance being of a temperature sensitive material such that the value of said resistance increases with increase of temperature. Said resistance is located in thermal relation with the member 105 (8 in Fig. 5), so as to assume the same temperature as the latter. By this means, the output current and for example a controlled voltage, where the device is employed for control of voltage, will be independent of temperature in spite of the fact that the input current falls slightly in following the fluctuations of the magneto-motive force of the permanent magnet with fluctuations in temperature.

Figure 9:
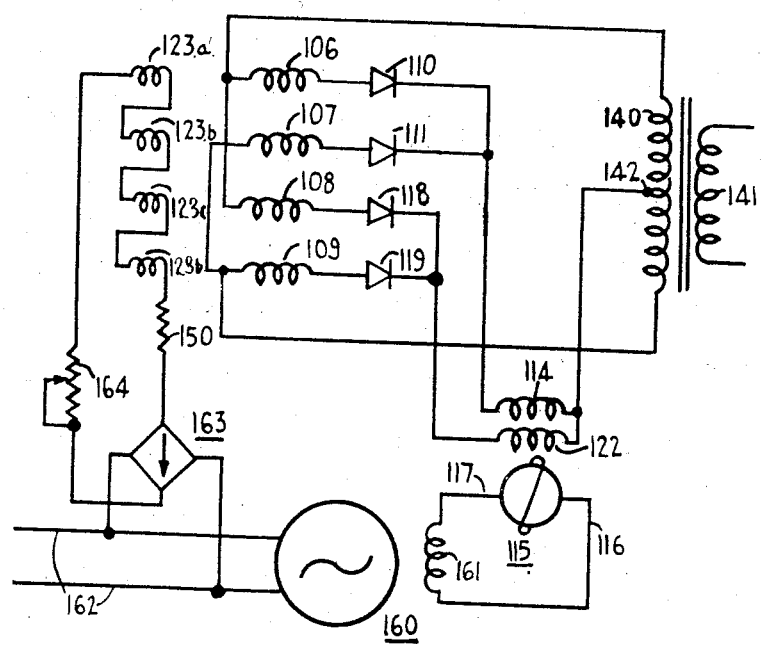
Figs. 9 and 10 are electrical circuit diagrams showing by way of example two applications, respectively, of arrangements according to the invention.

Fig. 9 shows an application of a push-pull arrangement according to the invention, to the voltage control of an alternator 160. In Fig. 9 the transductor arrangement is similar to that described with reference to Fig. 8 and the load parts 114 and 122 comprise controlling windings, acting in opposition to one another, of a metadyne exciter 115, the output windings 116 and 117 of which are connected with the exciting field 161 of the alternator. The latter supplies a load (not shown) by means of conductors 162 and the unidirectional input voltage for the transducer is derived by means of a full-wave dry-plate rectifier 163, having its input terminals connected with said conductors 162 and its output terminals connected to supply the control winding of the transductor. In all of the arrangements according to the invention, in place of a single control winding 123 embracing in common all the saturable core limbs, separate windings may be employed on each of the limbs (as described with reference to Figs. 4 and 5), or separate windings for each pair of limbs, namely for each core. In Fig. 9 such separate windings are illustrated, namely at 123a, 123b, 123c, and 123d, these windings wound respectively on the cores 101 and 104 of Fig. 8.

The control winding or windings are connected with the rectifier 163 in series with a variable resistance 164 whereby the value to which the alternator output voltage will be regulated may be adjusted. The input circuit of the transductor preferably includes a resistor 150 as described with reference to Fig. 8 where the regulating operation will be compensated for variations in temperature of the transductor.

Figure 10:
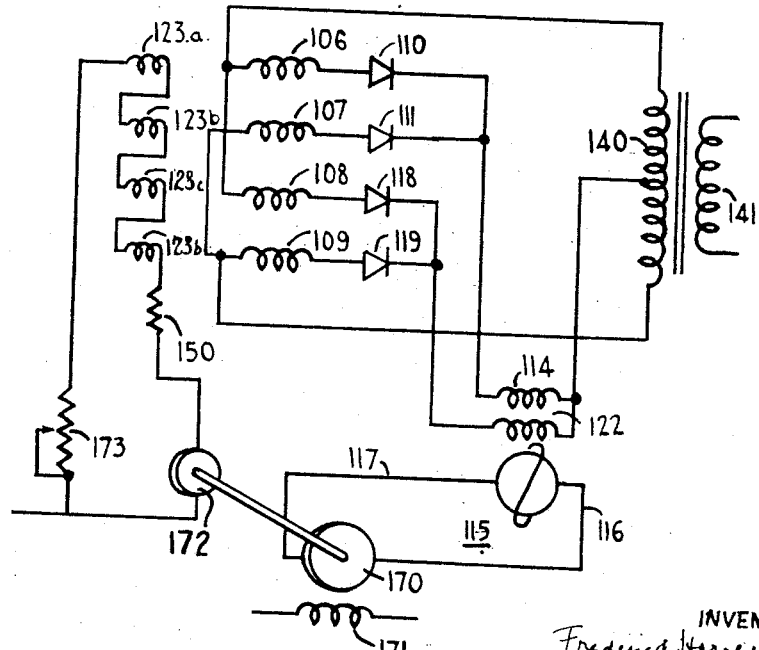

Fig. 10 shows a similar arrangement to that of Fig. 9 but employed for the speed control of a direct current motor having an armature 170 which is connected with the conductors 117 and 116 so as to receive a current dependent on the output of the transductor, and a separately excited field winding 171 which is connected with a suitable source of constant voltage direct current (not shown). The control winding or windings again illustrated as separate windings 123a-123d are connected with a tachometer generator 172 coupled mechanically with the motor 170. The transductor will, therefore, operate so as to increase or reduce the current supplied by the metadyne 115 of the motor armature 170 according as the voltage produced by the tachometer generator, and therefore the speed of the motor, is below or above a predetermined desired value whereby to maintain said speed at said value in spite of variations in load. The regulated value of the motor speed may be adjusted by means of a rheostat 173.

In any of the arrangements above described, the load may comprise a control winding or windings of a second-stage transductor arranged in any suitable manner, or a pair of transductors arranged for push-pull operation.

What we claim is:

1. A transductor arrangement comprising at least one saturable core having two generally U-shaped limbs connected together at the ends thereof by yoke portions, two output windings arranged on said limbs, respectively, and connected in an alternating current circuit, direct current magnetizing turns for said limbs arranged on the latter and connected in an input circuit, self-excitation means for said core, and a permanent magnet member in the form of a slab having a dimension in the magnetized direction thereof short in relation to the cross-sectional area of said member, the cross-sectional area of said member being large in relation to the cross-sectional area of said limbs and said member being in combination with said core with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb.

2. A transductor arrangement as defined in claim 1, including a temperature sensitive resistance located in thermal relation with the permanent magnet member and connected in circuit with the magnetizing turns so as to compensate the output of the arrangement against changes in temperature of said member.

3. A transductor arrangement comprising at least one saturable core having two generally U-shaped limbs connected together at the ends thereof by yoke portions, two output windings arranged on said limbs, respectively, and connected in an alternating current circuit including a full wave rectifier, direct current magnetizing turns for said limbs arranged on the latter and connected in an input circuit, a feedback winding on said core connected in series with the full wave rectifier in said alternating current circuit, and a permanent magnet member in the form of a slab having a dimension in the magnetized direction thereof short in relation to the cross-sectional area of said member, the cross-sectional area of said limbs and said member being in combination with said core with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb.

4. A transductor arrangement comprising at least one saturable core having two generally U-shaped limbs connected together at the ends thereof by yoke portions, an output circuit including two half wave rectifiers, two output windings arranged on said limbs, respectively, and connected in parallel with one another in said output circuit and in series, respectively, with said rectifiers, whereby said windings will carry pulsating unidirectional currents and provide self-excitation, direct current magnetizing turns for said limbs arranged on the latter and having means for connecting them in an input circuit, and a permanent magnet member in the form of a slab having a dimension in the magnetized direction thereof short in relation to the cross-sectional area of said member, the cross-sectional area of said member being large in relation to the cross-sectional area of said limbs and said member being in combination with said core with the two ends of each of said limbs adjacent and in magnetic connection with the north and south polar faces, respectively, of said magnet member, to receive therefrom a magneto-motive force of said magnetizing turns on said limb.

5. A transductor arrangement comprising two saturable cores each having two generally U-shaped limbs connected together at the ends thereof by yoke portions, an output winding arranged on each of said limbs and having means for connecting them in an alternating current circuit, a load having two oppositely acting parts connected in circuit with the output windings on said two cores, respectively, for push-pull operation, direct current magnetizing turns for said limbs arranged on the latter, means for connecting said turns in an input circuit, said cores being provided with self-excitation means, and a permanent magnet member in the form of a slab having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb.

6. A transductor arrangement as defined in claim 5, including a biasing winding for biasing the cores to a predetermined point of their output characteristics.

7. A transductor arrangement comprising two saturable cores each having two generally U-shaped limbs connected together at the ends thereof by yoke portions, magnetizing turns on said limbs, an output winding arranged on each of said limbs, an alternating current circuit having said winding connected therein and including full wave rectifiers, a load having two oppositely acting parts connected in circuit with the output windings on said cores, respectively, for push-pull operation, direct current magnetizing turns for said limbs arranged on the latter, means for connecting said turns in an input circuit, feedback windings on said cores connected in series with the full wave rectifiers in said alternating current circuit, and a permanent magnet member in the form of a slab and having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb.

8. A transductor arrangement comprising two saturable cores each having two generally U-shaped limbs connected together at the ends thereof by yoke portions, magnetizing turns on said limbs, an output winding arranged on each of said limbs, half wave rectifiers for the respective windings, the output winding on each limb being connected in parallel with the output winding on the other limb of the same core and in series with the respective half wave rectifiers whereby said windings will carry pulsating unidirectional currents and provide self-excitation, and a permanent magnet member in the form of a slab having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb.

9. A transductor arrangement comprising two saturable cores each having two generally U-shaped limbs connected together at the ends thereof by yoke portions, an output winding arranged on each of said limbs, direct current magnetizing turns for said limbs arranged on the latter and having means for connecting them in an input circuit, said cores being provided with self-excitation means, and a permanent magnet member in the form of a slab having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb, a center-tapped supply means, the two output windings on said core being connected with the opposite ends of the center-tapped supply means, a load comprising two parts, one of which parts is connected between the center-tapping of said supply means and the output windings on one core, and half wave rectifiers included in circuit with said output windings, respectively, to energize each part of the load with a unidirectional current derived in alternate half waves from opposite ends of said supply means and provide push-pull energization of the load in response to the input current.

10. A transductor arrangement as defined in claim 9, including a biasing winding for biasing the cores to a predetermined point of their output characteristics.

11. A transductor arrangement as defined in claim 9, including a temperature sensitive resistance located in thermal relation with the permanent magnet member and connected in circuit with the magnetizing turns so as to compensate the output of the arrangement against changes in temperature of said member.

12. In combination with a dynamo-electric machine having a controlling winding and input and output circuits, a transductor arrangement comprising at least one saturable core having two generally U-shaped limbs connected together at the ends thereof by yoke portions, an alternating current circuit including rectifying means, two output windings arranged on said limbs, respectively, and connected in said alternating current circuit with the controlling winding of said dynamo-electric machine, direct current magnetizing turns for said limbs arranged on the latter and connected in the output circuit of said dynamo-electric machine, with self-excitation means for said core, and a permanent magnet member in the form of a slab having a dimension in the magnetized direction thereof short in relation to the cross-sectional area of said member, the cross-sectional area of said member being large in relation to the cross-sectional area of said limbs and said member being in combination with said core with the two ends of each of said limbs adjacent and in magnetic connection with the north and south polar faces, respectively, of said magnet member, to receive therefrom a magneto-motive force directly opposable in each limb by the magneto-motive force of said magnetizing turns on said limb to adjust the current in said controlling winding in response to variations of an operating characteristic of the dynamo-electric machine and maintain said characteristic at a desired value.

13. In combination with a dynamo-electric machine, a transductor arrangement comprising two saturable cores each having two generally U-shaped limbs and yoke portions connecting them together at the ends thereof, an output winding arranged on each of said limbs, a controlling winding for said dynamo-electric machine having oppositely acting parts connected in circuit with the output windings on said two cores, respectively, for push-pull operation, direct current magnetizing turns for said limbs arranged on the latter and connected in an output circuit of said dynamo-electric machine, self-excitation means for said cores, and a permanent magnet member in the form of a slab having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member to receive therefrom a magneto-motive force directly opposable in each limb by the magneto-motive force of said magnetizing turns on said limb to adjust the current in said controlling winding of the dynamo-electric machine in response to variations of an operating characteristic of said machine and maintain said characteristic at a desired value.

14. In combination with a dynamo-electric machine having input and output circuits, a transductor arrangement comprising two saturable cores each having two generally U-shaped limbs and yoke portions connecting them together at the ends thereof, an output winding arranged on each of said limbs, direct current magnetizing turns for said limbs arranged on the latter and connected in the output circuit of said dynamo-electric machine, self-excitation means for said cores, and a permanent magnet member in the form of a slab having a dimension in the magnetized direction thereof short in relation to the cross-sectional area of said member, the cross-sectional area of said member being large in relation to the cross-sectional area of said limbs and said member being in combination with said cores with the two ends of each of said limbs adjacent and in magnetic connection with the north and south polar faces, respectively, of said magnet member to receive therefrom a magneto-motive force directly opposable in each limb by the magneto-motive force of said magnetizing turns on said limb, a centre-tapped supply means, the two output windings on each core being connected respectively with the opposite ends of said supply means, and a controlling winding for said dynamo-electric machine, comprising a first part connected between the centre-tapping of said supply means and the output windings on one core, and a second part connected between said centre-tapping and the output windings on the other core, half wave rectifiers included in circuit with said output windings, respectively, to energize each part of said controlling winding with a unidirectional current derived in alternate half waves from opposite ends of said supply means and providing push-pull energization of said controlling winding in response to variations of an operating characteristic of said machine to regulate said characteristic to a desired value.

References Cited in the file of this patent

UNITED STATES PATENTS

| | | |
|---|---|---|
| 2,477,990 | Lamm | Aug. 2, 1949 |
| 2,560,284 | Grandstaff | July 10, 1951 |
| 2,725,520 | Woodworth | Nov. 29, 1955 |

FOREIGN PATENTS

| | | |
|---|---|---|
| 676,835 | Great Britain | Aug. 6, 1952 |